United States Patent [19]

Shannon

[11] 4,293,343

[45] Oct. 6, 1981

[54] MORTARS AND CEMENTS HAVING IMPROVED FREEZE-THAW PROPERTIES AND METHOD OF ACHIEVING SAME

[75] Inventor: Richard F. Shannon, Lancaster, Ohio

[73] Assignee: Owens-Corning Fiberglas Corporation, Toledo, Ohio

[21] Appl. No.: 93,770

[22] Filed: Nov. 13, 1979

Related U.S. Application Data

[63] Continuation of Ser. No. 874,735, Feb. 3, 1978, abandoned.

[51] Int. Cl.³ .............................................. C04B 7/02
[52] U.S. Cl. ...................................................... 106/99
[58] Field of Search ............................ 106/98, 99, 104

[56] References Cited

U.S. PATENT DOCUMENTS

| | | | |
|---|---|---|---|
| 2,681,863 | 6/1954 | Croce et al. | 106/99 |
| 3,062,670 | 11/1962 | Marzocchi et al. | 106/99 |
| 3,147,127 | 9/1964 | Shannon | 106/99 |
| 3,289,371 | 12/1966 | Pearson et al. | 52/338 |
| 3,948,673 | 4/1976 | Chase et al. | 106/99 |
| 4,187,275 | 2/1980 | Bracalielly et al. | 264/511 |

*Primary Examiner*—James Poer
*Attorney, Agent, or Firm*—Ronald C. Hudgens; Robert F. Rywalski; William P. Hickey

[57] ABSTRACT

Inorganic mortars, cements, and concrete are subject to crazing, cracking and spalling when subjected to alternate freezing and thawing. The present invention significantly decreases this affect by providing a network of tiny glass filaments having a hydrophilic surface throughout the mortars and cements. Preferably there should be more than approximately 675 lineal inches of network forming filament per cubic inch of mortar.

3 Claims, No Drawings

MORTARS AND CEMENTS HAVING IMPROVED FREEZE-THAW PROPERTIES AND METHOD OF ACHIEVING SAME

This is a continuation, of application Ser. No. 874,735, filed Feb. 3, 1978, now abandoned.

BACKGROUND OF THE INVENTION

The present invention relates to practical, inexpensive mortars and aluminous high temperature cements and concretes which will withstand multiple freeze-thaw cycles without crazing, cracking or spalling to a much greater degree than have the prior art materials. Mortar and concrete that are exposed to the freezing and thawing cycle, particularly in areas where water stands thereon craze and crack when subjected to freezing, and spall when thawed thereafter. The crazing becomes more pronounced and deeper as the mortar or concrete is exposed to successive cycles. This is a major cause of the deterioration of the concrete highway system in the Northern part of the United States, and hundreds of millions of dollars are required for patching operations each year in the areas where the freeze-thaw cycle exists.

It is an object of the present invention, therefore, to provide new and improved mortars and concrete which are competitive in price to that currently used for pavement and/or building products such as shingles, siding and panels, and which will withstand the freeze-thaw cycle with considerably less damage than have prior art materials.

The prior art has experimented with all types of reinforcing materials in mortars and concrete for the purpose of increasing its strength and in some instances to try to reduce the crazing and cracking produced by the freeze-thaw cycle. To my knowledge, reinforcements have not appreciably reduced the crazing and cracking but some hold cracked areas in place so that the spalling thereof is less apparent. Water in the cracked areas, however, when frozen, spreads the cracking regardless of prior art reinforcements, so that conventional reinforcements have not been the answer to the freeze-thaw problem.

Glass fibers are produced commercially in two general types, one being blown fibers, and the other being pulled fibers. Blown fibers comprise random lengths of twisted interlocking fibers that are formed into mats or batts. Pulled fibers are made by simultaneously pulling from 200 to 2,000 molten streams of glass, grouping them when solidified into a strand, and coiling them around a rotating drum to produce a package. These pulled fibers must be coated with a size before coming together, otherwise they will break when they pass over the winding apparatus that guides them onto the rotating drum. The sizes used in practically all instances are water base sizes which cool the molten streams and prevent the mutual abrasion.

Both types of fibers have been available for over 30 years and pulled glass fiber strand has been used extensively as reinforcements in plastics. They have not proven successful in reinforcing mortars and cements, however, because the strand which was commercially available in the past has been deteriorated by alkali attack from the lime that exists in Portland cement. From the work that was done with glass fiber reinforcements in thermoset plastics, it was learned that strand having high strand integrity gave the highest flexural strength, tensile strength and impact strength; while those strands which were loosely united gave inferior strengths. Practically all strand which was produced for reinforcing purposes therefore has been sized with aqueous emulsions of plastics. These plastics help prevent deterioration from alkali attack if they remain around the strand. Strands of even high strand integrity, however, are attacked by Portland cement. Recently, so called alkali resistant glass strands have been developed. These strands even though they survive for a number of years in Portland cement mortar and concrete do not overcome the freeze-thaw problem.

According to principles of the present invention, it has been discovered that: if glass filaments are used which have a water dispersible binder and a surface which is devoid of organosilanes or lubricants which permanently make the surface of the filaments hydrophobic; and if such filaments are chopped and agitated to substantially completely disperse the filaments generally uniformly throughout, the mortar or concrete will have vastly improved resistance to the crazing, cracking and spalling produced by the freeze-thaw cycle. This is accomplished when more than approximately 0.01 percent by weight of the strand, based on the solids of the mortar or concrete are utilized, and little freeze-thaw improvement is gained by using more than approximately 1.0 percent by weight of the strand. It has been found that 0.2 percent or less of such strand is the generally preferred amount, and that it is very difficult to incorporate more than approximately 1 percent of such strand into thick mortars or concretes. It has been observed that mortar or concrete utilizing the filamentizable strand dries out much faster than conventional mortar or concrete, or mortar or concrete that is reinforced by nonfilamentizable strand; and in fact, the mortar and concrete of the present invention utilizing the filamentizable strand crumbles excessively if the surface is not kept wet during the setting of the materials.

It is now theorized that due to the packing of the sand and/or aggregate, there are minute void areas throughout mortar and concrete in which water remains after hydration is complete. When the filaments of the present invention are not used, these voids may remain full of water or may become full of water, which when frozen, expands and produces crazing and cracking.

Since only filaments that are wetted by water produce the improvements discovered by the present invention, it is further theorized that the individual filaments are so numerous that they run through these void areas. In addition, they are so numerous as to in some instances touch each other, or are sufficiently close to each other that water from voids runs along the surface of the filaments from one to another until it reaches the surface of the material. Mortar or concrete that sets with such filaments in place may also tend to produce smaller void areas. Furthermore, even if the fibers are deteriorated by alkali attack so that their strength is greatly decreased, the skeleton of the filament remains to remove water from the center of the material by means of the surface energy of the glass.

It has long been known that glass surfaces which are not "poisoned" cause water to spread out almost indefinitely, and that the angle of contact of water on nascent glass or "non-poisoned" glass approaches zero. Individually dispersed filaments, therefore, pass through or are sufficiently close to all voids of the material that they extract freezable water therefrom. Any free water that remains does not fill the voids so that freezing does not produce cracking or crazing. Even glass filaments which are badly deteriorated by alkali greatly reduce the cracking and crazing normally produced by the freeze-thaw cycle. Preferably, however, the filaments will be of an alkali resistant glass, so that the filaments remain sufficiently intact to add to the strength of the material.

DESCRIPTION OF THE PREFERRED EMBODIMENTS

Example 1

A strand was produced by drawing 408 molten streams of AR glass to an average diameter of approximately 0.00036 inch, by coating the same with the following aqueous solution and coiling the strand into a package:

| | |
|---|---|
| Polyvinyl acetate containing a sufficient minor amount of polyvinyl alcohol groups to make it dispersible | 7.5% |
| Cationic lubricant (fatty acid-tetraethylene pentamine condensate) | 0.2% |
| Glacial acetic acid | 0.15% |
| Ammonium hydroxide | 0.05% |
| Nonionic wetting agent (octyl phenoxy polyethoxyethanol) | 0.1% |
| Water | Balance |

The strand after drying at 220° F. was chopped into one half inch lengths, and mortars were made according to the following formulations in parts by weight:

| Material | Preferred | Range |
|---|---|---|
| Portland cement | 100 | 100 |
| Silica Sand | 100 | 50–700 |
| Water | 40 | 30–100 |
| Chopped strand | 0.4 | 0.01–2.0 |

Such mortars were cast into 1½"×1½"×6½" test specimens. The test specimens were kept moist and cured at 80° F. for 28 days. Thereafter the test samples were placed in pans and fully soaked in water. The pans were then placed in a freezer at 0° F. for two hours and frozen, and were then placed in a room at 80° F. for two hours and thawed. After 100 such cycles, the test specimens were intact and had only a slight surface irregularity.

Example 2

The process of Example 1 was repeated excepting that no glass strand or filaments were used in the mortars. The test samples after 100 test cycles had completely crumbled.

Example 3

The process of Example is repeated excepting that the strand is made using a non-dispersible size of the following composition:

| Materials | Percent By Weight |
|---|---|
| Water soluble epoxy | 1.5% |
| Polyvinyl alcohol normal methylolacrylamide copolymer | 3.85% |
| Emulsified particles of vinyl acetate-ethylene copolymer stabilized with acetylated polyvinyl alcohol | 3.85% |
| Gammamethoxypropyltrimethoxy silane | 0.10% |
| Glacial acetic acid | 0.30% |
| Carbowax | 0.10% |
| Lubricant | 0.30% |
| Paintable fluid, silicone emulsions | 0.50% |

The test samples made from this composition when tested have far inferior freeze-thaw characteristics than did the material of Example 1.

Example 4

The process of Example 1 is repeated excepting that 1% of the ½ inch lengths of chopped strand is utilized. Considerable difficulty is had in mixing this amount of chopped strand into the mortar. The test samples after 100 freeze-thaw cycles are intact and have less surface irregularity than do the test specimens of Example 1.

Example 5

The process of Example 1 is repeated excepting that 0.05% of the chopped strand was utilized in making this sample. This material showed the beginning of crazing and cracking after 100 freeze-thaw cycles.

Example 6

The process of Example 1 is repeated excepting that 0.2% of AR glass filament (U.S. Pat. No. 3,840,379) sized with the sizing of Example 1 is substituted. This material has substantially the same performance characteristics as those of Example 1.

In order that filaments can be produced commercially, they must be coated at forming. The filaments to be useful in the present invention must be sized with a water dispersible material that is substantially devoid of oils, greases, silicones, and organosilanes unless they are emulsified or are dispersed by alkali so that they leave the surface of the glass upon the disruption of the size. What is more, it is preferable that the filaments be so sized in order to prevent the filaments from picking up oils and greases out of the air during their formation, storage and shipping to the point where they are chopped and are incorporated into the mortar or concrete. Suitable samples of binder materials for the sizes are starches, polyvinylacetates that are made water dispersible by the inclusion of polyvinyl alcohol in the polymer chain, etc. The mortar or concrete preferably has a cement to sand ratio of from 0.5 to 1.0. Preferably, the mortar or concrete is mixed with no more water than is necessary to make it pourable so that free water does not stand on the surface. After pouring, the surface should be prevented from drying out as by covering with plastic, or artificially wetting the same periodically, etc. The filaments preferably have a diameter of between 0.00020 and 0.00070 inches. No advantages are obtained from larger diameters since the filaments become relatively stiff and the surface area per pound is considerably less.

A preferred material is formed using both filamentizable strand and non-filamentizable strand. It appears that the glass filaments, in addition to improving resistance to the freeze-thaw cycle, improve shatter resistance and crack propagation, while the fibers of a non-filamentized strand improve flexural and compressive strengths. The filaments when added to mortar containing non-filamentizable strand, therefore, provide a strength over and above that produced by the strand alone. In general, the amount of filamentizable strand for cast slurries may comprise from 0.01 to 0.70 and the strand will comprise 0.05 to 5 percent of lengths 1/16" to approximately 1" long. For slurries that are to be filter pressed, the filamentizable strand may comprise between 0.01 to 5.0% and the strands will comprise between 0.5% and 10.0%.

Example 7

The process of Example 1 was repeated excepting that 1.0% of a non-filamentizable AR strand composed of the fibers of Example 1 sized with the size of Example 3 was also included. The strand has a chopped length of ¾ inch. The specimens so produced have an improvement over the specimens of Example 1 in flexural strength, tensile strength and impact strength of approximately 20%.

Example 8

Spalling resistant refractory insulating cements are made from the following materials in parts by weight:

| Material | Preferred | Range |
|---|---|---|
| Clay | | 25 to 50 |
| Bentonite | 20.0 | |
| Ball | 15.0 | |
| Portland cement | 20.0 | 15 to 30 |
| Siliceous filler | | 10 to 30 |
| Diatomaceous earth | 5.0 | |
| Flyash | 15.0 | |
| Mineral wool | 25.0 | 10 to 30 |
| Glass strand | .2 | .01 to 1.0 |

The glass strand that was used was similar to that of Example 1, excepting that the strand was made of E-glass. The test specimens so produced have greatly improved resistance to spalling due to the freeze-thaw cycle than do specimens of the same formulation which do not include the filamentized glass fibers. In addition, the insulating cements have better resistance to slumping, crazing, cracking, and fissuring during drying than do cements devoid of the filaments. Insulating cements usually have a density of no more than approximately 65 pounds per cubic foot.

Example 9

A spalling resistant high alumina cement mortar is prepared from the following materials in percent by weight:

| Materials | Preferred | Range |
|---|---|---|
| High alumina cement | 30 | 10 to 50 |
| Sand | 69.8 | 50 to 90 |
| Strand of Example 8 | 0.2 | .05 to 1.0 |

The specimens are made using a water to cement ratio of 0.35. The test specimens produced have the same improvement in resistance to spalling during the freeze-thaw cycle test as do the specimens of Example 1.

The network of filaments that is utilized in the method and materials of the present invention must be formed by substantially completely filamentized strand since strand that is not filamentized has voids between the filaments which attract and hold water. On the other hand, individual filaments retain only a very thin layer of water, perhaps several molecules thick, and this water spreads almost indefinitely along its surface since the angle of wetting on nascent glass approaches zero. Since this is necessary, the surface of the individual filaments must not be permanently poisoned by silicones, organic polymers, oils or other nonwetting materials. It is known that nascent glass fibers in water have identical negative charges which repel each other, and this phenomenon is believed utilized to disperse the individual filaments into the criss-crossing fiber network that is necessary to pass through or adjacent all interstitial voids in the mortar. The filaments used in the present invention, in an aqueous media, develop a zeta potential of mutually repelling negative charges on the individual filaments which causes them to repell each other and spread throughout ionically neutral or similarly charged organic or inorganic body building fibers or particles. In those instances where the body building fibers are positively charged, it is possible to treat the glass filaments with acid and/or counter ions such as di or tri valent positive ions, as for example aluminum sulfate, or alum, to spread the glass filaments throughout the positively charged body building fibers.

Filaments that are held together as strands do not provide the improvement in water extraction of the present invention. Strands cannot form the necessary network of the present invention since strands are too big and cumbersome to be distributed by reason of zeta potential. With strands, the charges or the filaments are largely offset by being held together by the binder. Furthermore, water is held in the voids between the filaments of the strand to mitigate against the drying effect of the present invention. As previously stated, the reduced spalling and cracking achieved by the present invention occurs by reason of water being moved from interstitial voids to the surface of the article by travel along the surface of the fiber network. This leaves the interstitial voids only partly full of water so that expansion therein can occur during freezing without cracking the article. It is essential that the filaments be jackstrawed in a three dimensional, random fashion, and that at least 50% of the water wetting filaments be present as monofilaments completely separated from the strand from which they were added to the slurry.

The following is a table of the amount of 0.00036 inch diameter filaments per cubic inch of product for various weight percentages, based on a produce density of 120 pounds per cubic foot.

| Percent by Weight | Inches of monofilament per cubic inch of product |
|---|---|
| 0.01 | 675 |
| 0.05 | 3,375 |
| 0.2 | 14,318 |
| 0.5 | 33,750 |

The network of filaments that is utilized in the method and materials of the present invention must be formed by substantially completely filamentized strand, since strand that is not filamentized has voids between the filaments which attract and hold water. On the other hand, individual filaments retain only a very thin layer of water, perhaps several molecules thick, and this water spreads almost indefinitely along its surface since the angle of wetting on nascent glass approaches zero. Since this is necessary, the surface of the individual filaments most not be permanently poisoned by silicones, organic polymers, oils, or other nondispersible nonwetting materials. It is known that nascent glass fibers in water have identical negative charges which repell each other, and this phenomenon is believed utilized to disperse the individual filaments into a crisscrossing three dimensional fiber network that passes through or adjacent all interstitial voids in the mortar. The filaments used in the present invention, in an aqueous media, develop a zeta potential of mutually repelling negative charges on the individual filaments which causes them to repell each other and spread throughout the mortar.

It will be seen that a filament network wherein filaments extend through the product to adjacent the surface of the material will have utility in all types of inorganic cementitious materials, be they plastic mixes: such as mortars, cements, concrete, insulating cements, and pan cast products; or be they wet process products made from dilute slurries having no more than approximately 10% solids. Such processes include filter press processes and the Hatscheck process that is commonly used to produce cement pipe, cement board and pipe insulation, etc. In the case of plastic mixes, it becomes very difficult to mix more than approximately 1%, based on total solids, of glass filaments with the mixes as is apparent from the above table. Therefore, for plastic mixes, the preferred range will be from 0.01% to 1.0%. Also, as pointed out above, chopped strand may be included in these plastic mixes for strength considerations, in which case it is possible to use up to approximately 8% of chopped strand in addition to the amount of filaments given above. In the case of wet process products, it is, of course, possible to disperse greater amounts of the monofilaments throughout the greater amount of water that is being used. In such cases, it is possible to disperse up to approximately 10% based on solids, of chopped glass filaments into the water, so that in these processes it is possible to use from 0.01 to 10%. Also in these products, where it is desired to increase flexural strength, compressive strength and impact strength, it is possible to incorporate up to 10% of non-filamentizable chopped glass strand. In general, the ware that is produced by filtration processes will comprise the following materials in parts by weight:

| Ingredients | Broad | Preferred |
|---|---|---|
| Cement (Portland) | 100 | 100 |
| Filler (Sand) | 10–200 | 30–100 |
| Glass monofilament | 0.05–10 | 0.1–8.0 |
| Strands (glass) | 0–10 | 2–5 |
| Organic fibers | 0–10 | 2–5 |

Where insulation products such as pipe insulation is to be made by the filtering process, the products may have a density up to 65 lbs./ft.³ and will generally comprise the following solids on a weight basis:

| Ingredient | Broad | Preferred |
|---|---|---|
| Mineral fiber (mineral wool) | 10–50 | 20–40 |
| Lightweight filler | 0–30 | |
| (Flyash) | | 10–20 |
| (Diatomaceous Earth) | | 2–10 |
| Cement (Portland) | 10–30 | 15–20 |
| Clay | 0–49 | 30–40 |
| Glass monofilaments | .01–1.0 | 0.05–0.2 |
| Glass strand | 0–10.0 | 1–5.0 |

Where the insulation materials are to be made from the pan casting operations, the materials will generally comprise the following solids on a weight basis:

| Ingredient | Broad | Preferred |
|---|---|---|
| Mineral fiber | 19–39 | 20–30 |
| Particulate filler (Sand) | 0–60 | 50–60 |
| Hydraulic setting binder | 3–60 | |
| (Portland) | | 10–20 |
| (Slag) | | 10–50 |
| Glass monofilaments | 0.01–1.0 | 0.05–0.2 |

As previously indicated, the filament network of the present invention will have great application in concrete. Typical formulations for such concretes will generally comprise the following on a weight basis:

| Ingredient | Broad | Preferred |
|---|---|---|
| Sand | 10–40 | 25–40 |
| Cement (Portland) | 3–30 | 15–25 |
| Coarse Aggregate | 30–59 | 40–60 |
| Glass Monofilaments | 0.01–1.0 | 0.1–0.3 |
| Glass Strands | 0–8.0 | 2–4 |

To the above enough water (approximately 30 parts) to make a plastic mix is added; and when a lightweight product is desired, sufficient air entraining agent may be added to encorporate from ¼ to 2 percent by volume of air in the product. AR glasses (alkali resistant glasses) may be made from various compositions and are now produced commercially with the compositions in mol percent of materials given below:

| Material | Preferred | Range |
|---|---|---|
| $SiO_2$ | 66.6 | 62–75 |
| CaO | 6.0 | 1–10 |
| $Na_2O$ | 15.2 | 13–21 |
| $M_2O$ | 1.8 | 13–21 |
| $ZrO_2$ | 5.5 | 5–11 |
| $TiO_2$ | 4.9 | 0–6.5 |
| $Al_2O_3$ | | 0–4 |
| $Fe_2O_3$ | | 0–5 |

Such glasses are preferred glasses for the monofilaments where alkali containing cements are utilized.

It should be emphasized, that particularly beneficial results are had in dense mortars and concretes, with respect to an improvement in the freeze-thaw cycle by assuring that some voids exist when the mortars or concretes are first made. The desired porosity can be produced in various ways; but the combining of the filaments of the present invention and an air entraining agent is particularly desirable in assuring the results of the present invention.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. Insulation materials formed from the following ingredients in parts by weight:

| | |
|---|---|
| Mineral fiber | 19–39 |

| | |
|---|---|
| Particulate filler | 0–60 |
| Hydraulic setting binder | 3–60 |
| Glass monofilaments | 0.01–1.0 | said monofilaments forming a three dimensional monofilament network therein.

2. A high temperature insulating material comprising the following in approximate percentages by weight:

| | |
|---|---|
| mineral fibers | 10–50 |
| hydraulic cement | 10–30 |
| glass filaments | 0.01–0.5 |
| clay | 0–49 |
| filler | 0–30 | said filaments forming a jack-strawed three dimensional monofilament network throughout the other materials, said network having from 3,375 to 33,750 inches of spaced apart glass monofilaments per cubic inch of product, and said monofilaments having a surface with an angle of wetting that is substantially that of unpoisoned glass and which is generally devoid of water retaining or hydrophobic materials, and whereby the monofilament network causes the product to have significantly less spalling during freezing and thawing.

3. The material of claim 2 wherein it has a density of no more than approximately 90 pounds per cubic foot.

* * * * *

UNITED STATES PATENT AND TRADEMARK OFFICE
CERTIFICATE OF CORRECTION

PATENT NO. : 4,293,343
DATED : October 6, 1981
INVENTOR(S) : Richard F. Shannon

It is certified that error appears in the above—identified patent and that said Letters Patent is hereby corrected as shown below:

At column 3, line 58, the number "1" should be inserted between the words "Example" and "is".

At column 6, line 28, the word "or" should be changed to "on".

At column 6, line 67, the word "most" should be changed to "must".

Signed and Sealed this

Second Day of March 1982

[SEAL]

Attest:

Attesting Officer

GERALD J. MOSSINGHOFF

Commissioner of Patents and Trademarks